US010226766B2

(12) United States Patent
Kijlstra et al.

(10) Patent No.: US 10,226,766 B2
(45) Date of Patent: Mar. 12, 2019

(54) PROCESS FOR PREPARING HYDROCRACKING CATALYST COMPOSITIONS

(71) Applicant: SHELL OIL COMPANY, Houston, TX (US)

(72) Inventors: Wiebe Sjoerd Kijlstra, Amsterdam (NL); Ferry Winter, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 3 days.

(21) Appl. No.: 14/366,712

(22) PCT Filed: Dec. 20, 2012

(86) PCT No.: PCT/EP2012/076294
§ 371 (c)(1),
(2) Date: Jun. 19, 2014

(87) PCT Pub. No.: WO2013/092808
PCT Pub. Date: Jun. 27, 2013

(65) Prior Publication Data
US 2015/0126791 A1  May 7, 2015

(30) Foreign Application Priority Data
Dec. 23, 2011  (EP) .................... 11195467

(51) Int. Cl.
B01J 37/20 (2006.01)
C10G 47/20 (2006.01)
B01J 37/02 (2006.01)
B01J 29/08 (2006.01)
B01J 27/051 (2006.01)
B01J 23/883 (2006.01)
B01J 29/14 (2006.01)
B01J 29/16 (2006.01)
B01J 37/00 (2006.01)

(52) U.S. Cl.
CPC ............ B01J 37/20 (2013.01); B01J 23/883 (2013.01); B01J 27/0515 (2013.01); B01J 29/084 (2013.01); B01J 29/146 (2013.01); B01J 29/166 (2013.01); B01J 37/0009 (2013.01); B01J 37/0036 (2013.01); B01J 37/0213 (2013.01); C10G 47/20 (2013.01); B01J 2229/186 (2013.01); B01J 2229/36 (2013.01); B01J 2229/37 (2013.01); B01J 2229/42 (2013.01)

(58) Field of Classification Search
CPC ....................................................... B01J 37/20
See application file for complete search history.

(56) References Cited

U.S. PATENT DOCUMENTS

| 4,500,645 A | 2/1985 | Fuchikami et al. | |
| 5,013,699 A * | 5/1991 | Vassilakis | ................ B01J 29/08 502/73 |
| 2005/0179249 A1 | 9/2005 | Creyghton et al. | |
| 2005/0197249 A1 | 9/2005 | Creyghton et al. | |
| 2007/0135300 A1* | 6/2007 | Kagami | ................... B01J 23/85 502/208 |
| 2010/0148116 A1* | 6/2010 | Kanazirev | ............... C01F 7/004 252/182.12 |
| 2012/0279901 A1* | 11/2012 | Domokos | .............. B01J 23/888 208/109 |

FOREIGN PATENT DOCUMENTS

| CN | 1174756 | 3/1998 |
| CN | 1566280 | 1/2005 |
| EP | 310164 | 4/1989 |
| EP | 310165 | 4/1989 |
| EP | 428224 | 5/1991 |
| EP | 2258476 | 8/2010 |
| WO | 9932582 | 7/1999 |
| WO | 2006032698 | 3/2006 |
| WO | 2010126955 | 11/2010 |
| WO | 2011067258 | 6/2011 |

OTHER PUBLICATIONS

Van Bekkum et al.; "Hydrocarbon processing with zeolites"; Introduction to Zeolite Science and Practice; Chapter 15; pp. 602 and 603; 1991.
Brunauer et al.; "Absorption of Gases in Multimolecular Layers"; J. Am. Chem. Soc.; vol. 60; p. 309-; Feb. 1938.

* cited by examiner

Primary Examiner — Douglas B Call
(74) Attorney, Agent, or Firm — Charles W. Stewart

(57) ABSTRACT

A process for the preparation of a naphtha-selective hydrocracking catalyst comprising of from 3 to 4.8% wt of molybdenum, calculated as metal, and of from 1.5 to 3% wt of nickel, calculated as metal, which comprises loading a refractory oxide support comprising an alumina binder component and a zeolite Y component in a content of from 65 to 75 wt % based on the total weight of the catalyst, with nickel and molybdenum in the presence of citric acid, wherein the zeolite Y component has a unit cell size in the range of from 24.42 to 24.52 Å, a SAR in the range of from 8 to 15, and a surface area of from 850 to 1020 $m^2/g$.

13 Claims, No Drawings

PROCESS FOR PREPARING HYDROCRACKING CATALYST COMPOSITIONS

PRIORITY CLAIM

The present application is the National Stage (§ 371) of International Application No. PCT/EP2012/076294, filed Dec. 20, 2012, which claims priority from European application no. 11195467.3, filed Dec. 23, 2011, the disclosures of which are incorporated herein by reference.

FIELD OF THE INVENTION

The present invention concerns a process for preparing hydrocracking catalyst compositions, the compositions and their use in hydrocracking of hydrocarbons.

BACKGROUND OF THE INVENTION

Hydroconversion processes are important in the modern world in providing important basic fuels for everyday life. As it becomes of an increasing necessity to utilize heavier crude oil feedstocks, the oil refining industry has turned to hydrocracking processes to provide the lighter basic fuels which modern society demands. In certain regions, e.g. North America, the lighter liquid products boiling below 191° C. are more in demand than middle distillate products. Such lighter products are called the naphtha fractions, with heavy naphtha (the fraction boiling from 82° C. to 191° C.) being particularly desirable. There has been considerable effort devoted to the development of hydrocracking catalysts which combine high naphtha selectivity with a low tendency to overcrack towards light products, in particular to the less valuable $C_1$-$C_3$ and $C_4$ gaseous by-products, in combination with limited hydrogenation of aromatic rings.

Naphtha preferably has a high amount of aromatics as this gives a high octane number for the gasoline derived from it. A further advantage of less aromatics hydrogenation is that less hydrogen is consumed which is attractive from a process operation point of view. Limited hydrogenation and the resulting high aromatics content is not easily achieved as the hydrocracking catalyst preferably has a high hydrogenation activity in order to prevent overcracking of the feedstock.

Metal containing impregnating solutions for preparing metal containing catalysts are typically highly concentrated and stabilized by a diverse range of inorganic as well as organic additives such as citric acid. US 2005/0179249 describes impregnation solutions comprising metal-containing compounds and a chelating agent such as citric acid for the manufacture of diesel selective hydrocracking catalyst comprising a shaped catalyst carrier containing ultrastable zeolite Y or very ultrastable zeolite Y having a unit cell size less than 24.40 Å and a SAR preferably in the range of from 20 to 100 and from 3 to 5% wt of nickel and molybdenum in an amount in the range of from 6 to 18% wt, preferably 10 to 15% wt, or tungsten in an amount in the range of from 10 to 25% wt, preferably 15 to 22% wt.

WO 2011/067258 relates to the manufacture of zeolite for use in naphtha-selective catalyst compositions containing from 5 to 30, especially 5 to 10, of Group VI metal(s) and/or from 1 to 5 parts by weight of Group VIII metal(s), calculated as metal per 100 parts by weight (dry weight) of total catalyst composition. The zeolite has a unit cell size in the range of from 24.42 to 24.52 Å, a bulk silica to alumina molar ratio (SAR) in the range of from 10 to 15 and a surface area of from 910 to 1020 $m^2/g$.

SUMMARY OF THE INVENTION

It has now surprisingly been found that a naphtha-selective hydrocracking catalyst can be obtained having significantly reduced aromatics hydrogenation activity while still producing a high amount of desired product.

Accordingly, from a first aspect, the present invention comprises a process for the preparation of a naphtha-selective hydrocracking catalyst comprising of from 3 to 4.8% wt of molybdenum, calculated as metal, and of from 1.5 to 3% wt of nickel, calculated as metal, which comprises loading a refractory oxide support comprising an alumina binder component and a zeolite Y component in a content of from 65 to 75 wt % based on the total weight of the catalyst, with nickel and molybdenum in the presence of a solution comprising citric acid, wherein the zeolite Y component has a unit cell size in the range of from 24.42 to 24.52 Å, a SAR in the range of from 8 to 15, and a surface area of from 850 to 1020 $m^2/g$.

Zeolite Y having a unit cell size of from 24.42 to 24.52 Å, a SAR in the range of from 8 to 15, and a surface area of from 850 to 1020 $m^2/g$ is thought to be highly crystalline while containing only a very limited amount of extra framework alumina. Without wishing to be bound to any theory, it is thought that citric acid can improve naphtha-selective catalytic properties in case of a catalyst containing a high amount of this specific zeolite Y in combination with a low molybdenum and nickel content. In these very specific circumstances, citric acid is thought to facilitate metal deposition on the support thereby balancing the hydrogenation activity and the cracking activity to ensure low production of C1-C4 gaseous by-product and to improve the quality of the naphtha by limiting aromatics saturation.

The present invention further provides a process for hydrocracking a hydrocarbonaceous feedstock which process comprises contacting the feedstock at elevated temperature with the aforesaid catalyst composition.

DETAILED DESCRIPTION OF THE INVENTION

The process of loading the refractory oxide support with nickel and molybdenum may occur via pore volume impregnation or via co-mulling. In a pore volume impregnation process, the nickel and molybdenum may be loaded onto a pre-formed refractory oxide support. In other words, in a pore volume impregnation process the formation of the refractory oxide support may occur prior to its loading with one or more of nickel and molybdenum. Alternatively, in a co-mulling process, the nickel and molybdenum may be loaded during the formation of the supported catalyst.

The support may be loaded using either a single solution comprising citric acid and nickel and molybdenum in the form of metal containing compounds or two or more solutions of which at least one contains citric acid and at least one contains nickel and at least one contains molybdenum. The use of more than one solution may be required if metal containing compounds would precipitate if present in a single solution with citric acid. Throughout the present application, the singular is to be understood to encompass the plural unless explicitly stated otherwise.

When the or each solution is used for pore volume impregnation of the support, the amount of water, metal containing compound and citric acid are chosen such as to prevent metal precipitation. However, precipitated metals are acceptable when the or each solution is used in co-mulling. The exact amount of citric acid depends on the amount of catalytically active metal component and the kind of metal or metals present. The solution will generally contain from 1 to 25% by weight of citric acid, more specifically from 2 to 20% by weight, basis total amount of aqueous solution.

A preferred solution for use in the present invention is an aqueous solution comprising citric acid, nickel and molybdenum.

Metal containing compounds suitable for use in loading the support with nickel and molybdenum are compounds which are soluble in water in the presence of citric acid. Preferred metal containing compounds for use in loading are metal oxides and metal salts which are soluble in water in the presence of citric acid. A suitable metal oxide is molybdenum oxide, more specifically molybdenum trioxide. Metal salts preferred for loading are acetates, carbonates, nitrates and ammonium salts, such as nickel acetate, nickel nitrate, nickel carbonate, ammonium metatungstate, as are well known to those skilled in the art. For environmental reasons nitrate and carbonate salt solutions are preferred over the use of acetate solutions.

A solution for loading the support according to the process of the present invention is preferably prepared by adding one or more nickel and molybdenum and citric acid to water while stirring, optionally at increased temperature such as of from 20 to 95° C., more specifically of from 30 to 80° C., in order to obtain an aqueous solution in which the majority of the nickel and molybdenum have been dissolved. Preferably, at least 80% by weight of the added metal containing components has been dissolved, more specifically at least 90%, more specifically at least 95% and most preferably all added metal containing components have been dissolved.

The order of adding the, or each of the, nickel and molybdenum and citric acid depends on the kind and amount of the metal containing compounds used for preparing the aqueous solution.

Typically, the solution is contacted with the support under atmospheric pressure for at least 1 minute (usually 0.5-2 hours) prior to drying. The impregnation may also be carried out under reduced or over pressure under air or inert atmosphere. The temperature during the impregnation process is typically between room temperature and 80° C.

The refractory oxide support for use in the process according to the present invention comprises zeolite Y preferably having a unit cell size in the range from 24.42 to 24.51 Å, and most preferably from 24.46 to 24.50 Å. The bulk silica to alumina molar ratio (herein also termed "SAR") of the zeolite Y preferably is at least 8, more preferably at least 10, preferably above 10, preferably at least 10.2, more preferably at least 10.3, most preferably at least 10.5. The upper limit of the SAR is 15, more specifically at most 14, more preferably at most 13, especially at most 12.5, most preferably at most 12. The surface area of the zeolite Y is at least 850 m$^2$/g, more specifically at least 900 m$^2$/g, more specifically at least 910 m$^2$/g. This high surface area is advantageous in that it means that there is a large surface area available for catalysis.

The zeolite Y component within the refractory oxide support preferably has an alkali level of less than 0.15% wt based on the total weight of the zeolite Y component, more preferably less than 0.10% wt. The zeolite Y component desirably has as low an alkali level as possible.

All properties of the zeolite Y are measured before the zeolite Y is mixed with other compounds such as the binder component and catalytically active metals.

The silica to alumina molar ratio of the faujasite zeolite component is the bulk or overall ratio. This can be determined by any one of a number of chemical analysis techniques. Such techniques include X-ray fluorescence, atomic adsorption, and ICP-AES (inductive coupled plasma-atomic emission spectroscopy). All will provide substantially the same bulk ratio value.

The unit cell size for a zeolite Y component is a common property and is assessable to an accuracy of ±0.01 Å by standard techniques. The most common measurement technique is by X-ray diffraction (XRD) following the method of ASTM D3942-80.

Surface area is determined in accordance with the well known BET (Brunauer-Emmett-Teller) nitrogen adsorption technique, often simply termed the BET method. Herein also the general procedure and guidance of ASTM D4365-95 is followed in the application of the BET method to zeolite Y materials. To ensure a consistent state of the sample to be measured, suitably all samples undergo a pretreatment. Suitably the pretreatment involves heating the sample, for example to a temperature of 400 to 500° C. for a time sufficient to eliminate free water, e.g. 3 to 5 hours. The nitrogen porosimetry measurements utilised in the surface area (BET) determination, can also be used to determine other properties such as mesopore (pores having a diameter of 2 nm or more) area. For the zeolite Y for use in the process of the present invention, the mesopore area is generally in excess of 50 m$^2$/g.

All of the above measurement and determination procedures are well known to those skilled in the art.

The zeolite Y component is preferably derived from a powder. In either pore volume impregnation or co-mulling, the zeolite powder may be mixed with binder, and an acidic aqueous solution may be added to form a mixture which is mulled, extruded and calcined in conventional manner to form the refractory oxide support. Any convenient monobasic acid may be used for the acidic aqueous solution; examples are nitric acid and acetic acid. In the co-mulling process according to the invention, the catalytically active metal component may be added in the presence of a solution comprising citric acid prior to the extrusion and calcination steps. During extrusion, conventional extrusion aids may be utilized; usual extrusion aids include Methocel and Superfloc.

The zeolite Y powder is suitably prepared by a preparation process which involves a steaming treatment and one or more leaching treatments. Suitable processes for preparing the zeolite Y powder are described in WO-A-2006/032698, WO-A-2010/126955, and WO-A-2011/067258.

Preferred zeolite Y powders are prepared according to the process of WO-A-2010/126955 and/or the process of WO-A-2006/032698.

Most preferably, the zeolite Y is prepared and their properties measured as defined in WO-A-2011/067258. In this process, a zeolite Y powder having a unit cell size in the range of from 24.42 to 24.52; a bulk silica to alumina molar ratio (SAR) in the range of from 10 to 15; and a surface area of from 910 to 1020 m$^2$/g is formed. The process of forming said zeolite Y powder comprises a) providing a starting zeolite of the faujasite structure having a silica to alumina ratio of from 4.5 to 6.5 and an alkali level of less than 1.5% wt;

b) steam calcination by treating said starting zeolite at a temperature in the range of from 550 to 750° C. and at a partial pressure of steam in the range of from 5 to 50 vol %, basis total gas present, for a time effective to produce an intermediate zeolite having a unit cell size of from 24.40 to 24.50 Å;

c) contacting the intermediate zeolite with an acidified solution comprising of from 4 to 9 mmole of acid having a pKa below 0 per gram of zeolite and optionally an ammonium salt under conditions effective to produce a zeolite having a unit cell size in the range of from 24.42 Å to 24.52 Å; a SAR in the range of from 10 to 15; and a surface area of from 910 to 1020 m²/g; and d) recovering said zeolite Y powder.

The acid supplied in step c) in the formation of the zeolite Y powder is generally an inorganic acid such as hydrochloric acid, nitric acid, and/or sulphuric acid. Most preferably, hydrochloric acid is used. Also in step c) any ammonium salt may conveniently be used, such as ammonium nitrate, ammonium chloride and/or ammonium sulphate.

Without wishing to be bound to any theory, it is thought that the mild steaming conditions prevent clustering and make it possible to remove the majority of the extra framework alumina in the subsequent deep leaching step while leaving the crystalline structure intact as can be derived from the fact that the unit cell size tends to be similar before and after the leaching step. Steaming at higher water partial pressure and/or higher temperature seems to make it impossible to selectively leach extra framework aluminium in the subsequent step. The zeolite Y powder formed according to this process is highly crystalline while only containing a very limited amount of extra framework alumina. Such zeolite Y powder has physical and chemical properties which are advantageous for various applications including but not limited to its use in the present process for the preparation of a hydrocracking catalyst, preferably for hydrocracking a hydrocarbon feedstock to naphtha.

In a mulling or co-mulling step for forming the refractory oxide support, the zeolite Y powder generally is mixed with a binder component and an acidic aqueous solution to form a mixture, which may then be extruded and calcined. The binder component may be an amorphous binder component. Generally this is an alumina binder, particularly boehmite, pseudoboehmite, or gamma alumina. Preferably the binder is a gamma alumina, more preferably a gamma alumina with a surface area of at least 50 m2/g, more preferably a surface area more than 60 m2/g, more preferably more than 70 m2/g, most preferably more than 80 m2/g. Preferably, the binder component is present in an amount of from 1 to 50% by weight, most preferably 5% to 40% by weight, based on the total weight of the support. References herein to weight percentages based on the total weight of the refractory oxide support are to be understood to refer to the calcined support and to exclude nickel and molybdenum, especially when the refractory oxide support is present within a supported catalyst formed via co-mulling.

Extrusion may be effected using any conventional, commercially available extruder. In particular, a screwtype extruding machine may be used to force the mixture through orifices in a die plate to yield catalyst extrudates of the required form, e.g. cylindrical or trilobed. The strands formed on extrusion may then be cut to the appropriate length. If desired, the extrudates may be dried, e.g. at a temperature of from 100 to 300° C. for a period of 10 minutes to 3 hours, prior to calcination.

Calcination of the extrudates is conveniently carried out in air at a temperature in the range of from 300 to 850° C. for a period of from 30 minutes to 4 hours to form the refractory oxide support. Following calcination, the amount of zeolite Y component in the refractory oxide support is preferably 70 or 80% by weight or greater based on the total weight of the support. It may be up to 90% by weight, based on the total weight of support. Most preferably, the amount of zeolite Y component is in the range of from 75 wt % to 90 wt % based on the total weight of the refractory oxide support.

The support preferably has a compacted bulk density (CBD) in the range of from 0.35 to 0.50 g/ml, preferably of from 0.35 to 0.45 g/ml, most preferably of from 0.38 to 0.43 g/ml. The CBD is to be measured according to the standard method ASTM D 4164-82.

In the process according to the invention, if the catalyst is prepared by impregnation (rather than co-mulling), the support preferably has been calcined prior to being loaded with citric acid, nickel and molybdenum.

Following the loading of the refractory oxide support with the one or more solutions containing citric acid, nickel and molybdenum, the process of the invention may further comprise a step of drying the loaded support to form a catalyst precursor composition. The drying step may occur either when the nickel and molybdenum are loaded from an impregnating solution or by co-mulling. The drying step assists in keeping the metals well dispersed over the refractory oxide support. The loaded support may be dried at a temperature below the decomposition temperature of the citric acid. Preferably, the loaded support may be dried at a temperature of at most 175° C., more specifically at most 160° C. following the treatment with the one or more solutions. Preferably, the loaded support may be dried at a temperature of at least 100° C. Preferably, in this step the loaded support may be dried for a period of 10 minutes to 5 hours to form the catalyst precursor composition.

The amount of citric acid present in the catalyst precursor composition following the drying step is preferably of from 0.01 to 20% by weight, based on total weight of catalyst precursor composition, more preferably of from 0.05 to 18% by weight. More preferably, the amount is at least 0.08, more preferably at least 0.10, more preferably at least 0.15, most preferably at least 0.20% by weight. The amount preferably is at most 16% by weight, more preferably at most 14% by weight, more preferably at most 12% by weight.

The process according to the present invention further comprises a step of calcining the loaded refractory oxide support to produce a catalyst composition, following the loading of the support with a solution comprising citric acid and a catalytically active metal. The calcination step preferably comprises heating the loaded refractory oxide support in air at a temperature of at most 850° C. and at least 300° C., more specifically at least 400° C. or 450° C. or 500° C. Preferably, the loaded refractory oxide support according to the present invention is calcined for a period of 30 minutes to 4 hours to produce a catalyst composition.

Following impregnation or co-mulling but prior to calcination, the metal components in the catalyst precursor composition are generally present in the form of the metal oxide or metal salt as applied, or in the form of the corresponding complex with an anion of the citric acid. In the course of calcination the citric acid is thought to be largely removed. Following calcination, the metal components in the catalyst composition are generally present in the form of the metal oxide.

Following calcination, the catalyst may contain nickel and molybdenum as their oxides.

If the catalyst is prepared by impregnation, the catalyst preferably has a CBD in the range of from 0.50 to 0.60 g/ml, preferably of from 0.51 to 0.59 g/ml, more preferably of from 0.53 to 0.57 g/ml.

If the catalyst is prepared by co-mulling, the catalyst preferably has a CBD in the range of from 0.42 to 0.53 g/ml, preferably of from 0.44 to 0.51 g/ml, more preferably of from 0.45 to 0.50 g/ml, most preferably around 0.48 g/ml.

Particularly advantageous results are obtained when the preferred metal combinations are present in the sulphide form. Consequently, the process according to the present invention optionally comprises a further step of sulfidation following the aforementioned step of calcining the support that has been loaded with one or more catalytically active metals in the presence of a solution comprising citric acid. Sulfidation may be carried out after the catalyst composition has been loaded into a hydrocracking reactor. Alternatively, the catalyst composition may be sulfided prior to its use in a hydrocracking reactor. The catalyst composition may preferably be sulfided using a liquid phase sulfidation agent prior to use of the catalyst composition in a hydrocracking reactor. Most preferably, the catalyst composition may be sulfided using $H_2S$ in the gas phase at elevated temperature, typically above 300° C., prior to use of the catalyst composition in a hydrocracking reactor.

The process of the present invention is further illustrated by way of the following preferred embodiments. In a first embodiment, the present invention comprises a pore volume impregnation process for the preparation of a hydrocracking catalyst which process comprises (1) preparing a refractory oxide support by
(a) mixing zeolite Y powder with an alumina binder component and an acidic aqueous solution to form a mixture;
(b) mulling the mixture;
(c) extruding the mixture to form an extrudate;
(d) optionally drying the extrudate;
(e) calcining the extrudate to form a zeolite Y containing refractory oxide support;
(2) loading the pre-formed calcined refractory oxide support via pore volume impregnation with a solution, preferably an aqueous solution, comprising citric acid, nickel and molybdenum;
(3) optionally drying the loaded support to form a catalyst precursor composition;
(4) calcining the catalyst precursor composition to form a catalyst;
(5) optionally sulfiding the catalyst.

The mixing, mulling, extruding, drying, calcining, loading and sulfiding steps all occur as described hereinbefore. All of the preferences set forth above regarding said steps and the identities and weight percentages of the component materials involved therein are hereby expressly incorporated.

In another embodiment, the present invention comprises a co-mulling process for the preparation of a naphtha-selective hydrocracking catalyst which process comprises (1) mixing zeolite Y powder with an alumina binder component and solution, preferably an aqueous solution, comprising a citric acid, nickel and molybdenum;
(2) co-mulling the mixture;
(3) extruding the mixture to form an extrudate;
(4) optionally drying the extrudate;
(5) calcining the extrudate to form a supported catalyst comprising a refractory oxide support, nickel and molybdenum;
(6) optionally sulfiding the catalyst.

The mixing, mulling, extruding, drying, calcining, loading and sulfiding steps all occur as described hereinbefore. All of the preferences set forth above regarding said steps and the identities and weight percentages of the component materials involved therein are hereby expressly incorporated.

Typical properties for a catalyst obtained by the process according to the present invention includes a water pore volume in the range of from 0.5 to 1.1 cc/g and a flat plate (FP) crush strength of in excess of 3.5 lb/mm, preferably at least 5, more preferably in the range of from 5 to 7. Typical catalysts may have an average particle length of from 4 to 7 nm. Typically also a catalyst of the present invention has a compacted bulk density (CBD) of at least 0.40 g/cc, preferably at least 0.45; at most the CBD is suitably 0.60 g/cc. Herein CBD is assessed following the method of ASTM D 4180-03. Preferably, the carrier for use in the present invention also has a CBD of at least 0.40 g/cc, preferably at least 0.45 and at most 0.60 g/cc.

The catalyst composition finds application as a naphtha-selective catalyst composition. Thus, from another aspect the present invention provides a process for converting a hydrocarbonaceous feedstock into lower boiling materials which process comprises contacting the feedstock with hydrogen at elevated temperature and elevated pressure in the presence of a catalyst composition prepared according to the process of the first aspect of the present invention.

Examples of such processes comprise single-stage hydrocracking, two-stage hydrocracking, and series-flow hydrocracking. Definitions of these processes can be found in pages 602 and 603 of Chapter 15 (entitled "Hydrocarbon processing with zeolites") of "Introduction to zeolite science and practice" edited by van Bekkum, Flanigen, Jansen; published by Elsevier, 1991.

It will be appreciated that the hydroconversion processes of the present invention can be carried out in any reaction vessel usual in the art. Thus the process may be performed in a fixed bed or moving bed reactor.

Also the catalyst may be used in conjunction with any suitable co-catalyst or other materials usual in the art. Thus for example the catalyst of the invention may be used in stacked bed formation with one or more other catalysts useful in hydroprocessing, for example with a catalyst containing a different zeolite, with a catalyst containing a zeolite Y of different unit cell size, most preferably a unit cell size of greater than 24.40 Å, with a catalyst utilizing an amorphous carrier, and so on. Various stacked bed combinations have been proposed in the literature: WO-99/32582; EP-A-310,164; EP-A-310,165; and EP-A-428,224 may, for example, be mentioned.

The hydrocarbonaceous feedstocks useful in the present process can vary within a wide boiling range. They include atmospheric gas oils, coker gas oils, vacuum gas oils, deasphalted oils, waxes obtained from a Fischer-Tropsch synthesis process, long and short residues, catalytically cracked cycle oils, thermally or catalytically cracked gas oils, and syncrudes, optionally originating from tar sand, shale oils, residue upgrading processes and biomass. Combinations of various hydrocarbon oils may also be employed. Typically, though, the feedstocks most suited for the process of the invention are the lighter feedstocks or fractions obtained by treatment of a feedstock through cracking or fractionation. Such feedstocks include atmospheric and vacuum gas oils, gas oils formed by cracking processes, cycle oils, and similar boiling range feedstocks. The boiling range will generally be of the order of from about 90 to 650° C.

Preferably, the feedstock will be a an atmospheric gas oil having a boiling range of from 270 to 345° C.

The feedstock may have a nitrogen content of up to 5000 ppmw (parts per million by weight) and a sulphur content of up to 6 wt %. Typically, nitrogen contents are in the range from 10, e.g. from 100, to 4000 ppmw, and sulphur contents are in the range from 0.01, e.g. from 1, to 5 wt %. It is possible and may sometimes be desirable to subject part or all of the feedstock to a pretreatment, for example, hydrodenitrogenation, hydrodesulphurisation or hydrodemetallisation, methods for which are known in the art.

The hydrocracking process of the invention may conveniently be carried out at a reaction temperature in the range of from 250 to 500° C.

The present hydrocracking process is preferably carried out at a total pressure (at the reactor inlet) in the range of from $3 \times 10^6$ to $3 \times 10^7$ Pa, more preferably from $8 \times 10^6$ to $2.0 \times 10^7$ Pa. Where a hydrocracking process is carried out at a low pressure of, for example, up to $1.2 \times 10^7$ Pa this may be termed 'mild hydrocracking'.

The hydrogen partial pressure (at the reactor inlet) is preferably in the range from $3 \times 10^6$ to $2.9 \times 10^7$ Pa, more preferably from $8 \times 10^6$ to $1.75 \times 10^7$ Pa. A space velocity in the range from 0.1 to 10 kg feedstock per liter catalyst per hour ($kg \cdot l^{-1} \cdot h^{-1}$) is conveniently used. Preferably the space velocity is in the range from 0.1 to 8, particularly from 0.2 to 5 $kg \cdot l^{-1} \cdot h^{-1}$. The ratio of hydrogen gas to feedstock (total gas rate) used in the present process will generally be in the range from 100 to 5000 Nl/kg, but is preferably in the range from 200 to 3000 Nl/kg.

From another aspect, the present invention encompasses use of a catalyst composition prepared by the process of the present invention in a hydrocracking process.

The present invention also encompasses use of a catalyst composition prepared by the process of the present invention in a hydrocracking process for one or more of the following purposes: (a) limiting the hydrogenation of aromatic compounds in the hydrocracking process, (b) limiting the generation of naphthenes in the hydrocracking process, and (c) limiting the consumption of hydrogen in the hydrocracking process.

The present invention will now be illustrated by the following Examples.

EXAMPLES

In the Examples the following test methods have been used:
Unit Cell Size:
Determined by X-ray diffraction using the method of ASTM D-3942-80.
Surface Area:
Determined in accordance with the conventional BET (Brunauer-Emmett-Teller) method nitrogen adsorption technique as described in the literature at S. Brunauer, P. Emmett and E. Teller, J. Am. Chm. Soc., 60, 309 (1938), and ASTM method D4365-95. In the determinations quoted below, the results are given as a single point assessment taken at a nitrogen partial pressure of 0.03 following a high temperature pretreatment.
Silica to Alumina Molar Ratio (SAR):
Determined by chemical analysis; values quoted are 'bulk' SAR (that is to say the overall SAR) and not specifically the SAR of the crystalline framework.

Example 1—Comparative Catalyst

This catalyst was prepared in accordance with the teaching of WO 2006/032698. The zeolite was prepared by a method similar to the one described in Example 4 of WO 2006/032698.

Zeolite Y of SAR 5.2, unit cell size 24.64 Å, 12.99 wt % sodium oxide, ex-Zeolyst International, was converted into a low alkali (less than 1.5 wt % alkali oxide) ammonium form Y zeolite using the technique described in U.S. Pat. No. 5,435,987 which involves ion exchange of the sodium form zeolite Y, followed by ammonium ion exchange.

This low alkali ammonium form zeolite Y was then steam calcined for 45 minutes at a temperature of 630° C. in 100 vol % steam in a rotary kiln to provide a zeolite having a unit cell size 24.42 Å and SAR of 5.6. The steamed zeolite was then subjected to an acid-dealumination treatment as a one-step treatment with an aqueous solution of hydrochloric acid in an amount of 0.05 g HCl/g zeolite for at least 1 hour at 60° C. The resulting zeolite Y powder was of unit cell size 24.50 Å, SAR 8.25, alkali content 0.06 wt % and a surface area of 865 m²/g.

The zeolite Y thus obtained was loaded into a muller at low speed and mixed with alumina (HMPA alumina ex Criterion Catalysts & Technologies) in an amount sufficient to provide a weight ratio of zeolite to alumina, dry basis, of 80:20, and Methocel K-15MS in an amount of 1.8 wt % basis total dry solids, was added and the whole mixed at high speed for 1 to 2 minutes. Methocel K-15MS is an extrusion aid commercially available from Dow Chemical Company. A metals solution containing the desired metals was added to the mixture. The metals solution was an aqueous solution of a nickel nitrate solution (14.4 wt % nickel) and an ammonium metatungstate solution (73 wt % tungsten); the overall metals solution contained 6.3 wt % nickel and 20.5 wt % tungsten and had a pH in the range of 2.0 to 2.4.

Deionised water to achieve a loss on ignition in the product of 50% and nitric acid (2 wt % total dry solids) to peptise the alumina was then added and mixing continued at high speed until the colour of the mix changed to a darker green and large lumps appeared in the mix from agglomeration of the materials. Superfloc, in an amount of 1.0 wt %, basis total dry solids, was then added and the whole mixed for a further 3 to 5 minutes until an extrudable mix was formed. The mix was then extruded in a screw extruder into extrudates having, in cross section, a tri-lobe shape. The extrudates were dried in a rotating drum at a temperature not exceeding 130° C. for about 90 minutes, and then calcined at 730° C. for about 2 hours. This support was impregnated by pore volume impregnation with the metals solution as described above.

Subsequently, the impregnated support was dried at 120° C. to form a catalyst precursor composition, and the catalyst precursor composition was calcined in air at 450° C. for about 2 hours to form the catalyst.

The final catalyst had the following composition: 3.3 wt % as nickel oxide (2.6 wt % nickel); 10.6 wt % as tungsten oxide (8.4 wt % tungsten); 68.9 wt % zeolite Y; and 17.2 wt % alumina binder, all basis total catalyst.

Example 2—Catalyst

Zeolite Y of SAR 5.6, unit cell size 24.64 Å, 12.40 wt % sodium oxide, ex-Zeolyst International, was converted into a low alkali (less than 1.5 wt % alkali oxide) ammonium form Y zeolite using the technique described in U.S. Pat. No. 5,435,987 which involves K+ ion exchange of the sodium form zeolite Y, followed by ammonium ion exchange. The resulting zeolite was of unit cell size 24.70 Å, SAR 5.6, potassium oxide content 0.45 wt %, and sodium oxide content 0.35 wt %.

This low alkali ammonium form zeolite Y was then steam calcined for 2 hours at a temperature of 630° C. in 20 vol % steam in a rotary kiln to provide a zeolite having a unit cell size 24.46 Å and SAR of 5.6. The steamed zeolite was then slurried with an aqueous ammonium chloride containing solution (0.40 kg NH$_4$Cl/kg of dry zeolite) at a temperature of 60° C. and was kept at that temperature during 45 minutes. The slurry contained 18.5% wt of zeolite. Subsequently, hydrogen chloride was added to the slurry (0.20 kg hydrogen chloride/kg of dry zeolite). The temperature was kept at 70° C. during 15 minutes. The slurry was then transferred to another tank, diluted with cold water and filtered over a vacuum belt filter. On the belt, the leached zeolite was washed with warm water. The zeolite coming from the belt was reslurried with an aqueous ammonium chloride containing solution (0.50 kg NH$_4$Cl/kg of dry zeolite) at a temperature of 60° C. and was kept at that temperature during 1.5 hours minutes. The slurry contained 18.5% wt of zeolite. Finally, the zeolite was washed with water and dried.

The final zeolite Y powder was of unit cell size 24.49 Å, SAR 10.5 and a surface area of 940 m$^2$/g.

The zeolite Y thus obtained was loaded into a muller at low speed and mixed with a metals solution for five minutes following which alumina (WPA alumina ex Criterion Catalysts & Technologies) in an amount sufficient to provide a weight ratio of zeolite to alumina, dry basis, of 80:20, and Methocel K-15MS in an amount of 1.8 wt % basis total dry solids, was added and the whole mixed at high speed for 1 to 2 minutes.

Deionised water to achieve a loss on ignition in the product of 50% and nitric acid (2 wt % total dry solids) to peptise the alumina was then added and mixing continued at high speed until large lumps appeared in the mix from agglomeration of the materials. Superfloc, in an amount of 1.0 wt %, basis total dry solids, was then added and the whole mixed for a further 3 to 5 minutes until an extrudable mix was formed. The mix was then extruded in a screw extruder into extrudates having, in cross section, a tri-lobe shape. The extrudates were dried in a rotating drum at a temperature not exceeding 130° C. for about 90 minutes, and then calcined at 730° C. for about 2 hours.

A metals solution was prepared by adding 0.91 grams of nickel carbonate to 6 grams water at room temperature, stirring, adding 1.30 grams citric acid. Next 0.92 grams molybdenum trioxide was added and subsequently additional water was added so that the total volume was 12.9 ml. 16.71 grams of support was impregnated by pore volume impregnation with the metals solution thus obtained. Subsequently, the impregnated support was dried at 120° C. to form a catalyst precursor composition, and the catalyst precursor composition was calcined in air at 450° C. for about 2 hours to form the catalyst.

The final catalyst had the following composition: 2.5 wt % as nickel oxide (2.0 wt % nickel); 5.1 wt % as molybdenum oxide (3.4 wt % molybdenum); 73.9 wt % zeolite Y; and 18.5 wt % alumina binder, all basis total catalyst.

Example 3—Activity Testing

The hydrocracking performance of the catalysts prepared as described in Examples 1 and 2 were assessed. These catalysts were not further dried before testing of the activity.

The testing was carried out in once-through microflow equipment which had been loaded with a catalyst bed comprising 15 ml of the test catalyst diluted with 15 ml of 0.1 mm SiC particles. After loading, the catalyst bed was presulphided prior to testing. Each test involved the sequential contact of a hydrocarbonaceous feedstock with the catalyst bed in a once-through operation under the following process conditions: a space velocity of 1.5 kg feed oil per 1 catalyst per hour (kg·l$^{-1}$·h$^{-1}$), a hydrogen gas/feed oil ratio of 1000 Nl/kg, and a total pressure of 11,000 kPa (110 bar) at the inlet.

The test feedstock used had the following properties:
Carbon content: 87.80 wt %
Hydrogen content: 12.17 wt %
Sulphur content: 0.0188 wt %
Nitrogen (N) content: 96 ppmw
Added n-Decylamine: 10.15 g/kg
(to achieve 1000 ppmv NH$_3$)
Added sulphur[1]: 8.91 g/kg
(to achieve 5000 ppmv H$_2$S)
Density (15/4° C.): 0.9064 g/ml
Initial boiling point: 175° C.
50% w boiling point: 304° C.
Final boiling point: 441° C.
Fraction boiling below 370° C.: 87.70 wt %
Fraction boiling below 191° C.: 2.90 wt %

[1] Sulphur is added in the form of Sulfrzol 54 which is a catalyst sulfiding agent commercially available from Lubrizol Corporation. Sulfrzol 54 and Lubrizol are trade marks.

Hydrocracking performance was assessed at conversion levels from 55 to 92 wt % net conversion of feed components boiling above 191° C. Hydrocracking activity, was assessed as the temperature required to obtain 70% wt net conversion of feed components boiling above 191° C. The results are shown in Table 1 below.

TABLE 1

|  | Comparative Catalyst | Catalyst of Example 2 |
| --- | --- | --- |
| Temperature required (° C.) | 387 | 387 |
| Hydrogen consumption (% wt on feed) | 2.43 | 2.23 |
| Conversion of monoaromatics (% wt on feed) | 45 | 23 |

From Table 1, it is clear that the catalyst of the present invention achieves a substantial reduction in aromatics conversion which is also reflected in the reduced hydrogen consumption.

The retention of the aromaticity of the feedstock is confirmed by Table 2 giving an analysis on the naphthenes and aromatics present in the product slate which consists of hydrocarbons containing at least 5 carbon atoms and boiling at a temperature of at most 200° C. The product is normalised to a conversion of from 77 to 82% of the product boiling at 191° C. or higher.

Cat. 1 stands for the comparative catalyst prepared according to Example 1, and Cat. 2 stands for the catalyst prepared according to Example 2. Naph. stands for naphthenes and Arom. stands for aromatic compounds. C-nr stands for hydrocarbons containing the specified number of carbon atoms.

Table 2 clearly shows the higher aromatics retention by the catalyst according to the present invention, accompanied by the generation of less naphthenes.

TABLE 2

| C-nr | Cat. 1 Naph. | Cat. 2 Naph. | Cat. 1 Arom. | Cat. 2 Arom. |
|---|---|---|---|---|
| 1-5 | 0.4 | 0.2 | 0.0 | 0.0 |
| 6 | 4.8 | 4.5 | 0.3 | 0.9 |
| 7 | 10.6 | 10.4 | 2.6 | 3.8 |
| 8 | 12.6 | 12.4 | 4.0 | 6.1 |
| 9-11 | 23.0 | 19.0 | 8.0 | 12.3 |
| Total | 51.4 | 46.6 | 14.8 | 23.0 |

That which is claimed is:

1. A process for the preparation of a naphtha-selective hydrocracking catalyst, which process comprises:
   forming a refractory oxide support by mixing an alumina binder component in an amount in the range of from 5% to 40% by weight based on the total weight of the refractory oxide support and a low alkali ammonium form zeolite Y component having an alkali level of less than 0.15% wt based on the total weight of the zeolite Y component, in an amount in the range of from 65 to 75 wt % based on the total weight of the refractory oxide support, wherein said low alkali ammonium form zeolite Y component has a unit cell size in the range of from 24.42 to 24.52 Å, a silica-to-alumina ratio (SAR) in the range of from 10 to 15, and a surface area of from 910 to 1020 $m^2/g$, to form a mixture;
   extruding said mixture to form an extrudate;
   calcining said extrudate in air at a temperature of at least 300° C. and at most 850° C. for a time period of from 30 minutes to 4 hours to form the refractory oxide support;
   impregnating the refractory oxide support with an aqueous solution comprising nickel, molybdenum and citric acid to provide a loaded support and followed by drying the loaded support at a temperature below the decomposition temperature of the citric acid to provide a catalyst precursor composition such that it has an amount of citric acid present in the range of from 0.01 to 20% by weight, based on the total weight of the catalyst precursor; and
   calcining the catalyst precursor composition to provide the naphtha-selective hydrocracking catalyst containing from 3 to 4.8% wt. molybdenum, calculated as metal, and from 1.5 to 3% wt nickel, calculated as metal, based on the total naphtha-selective hydrocracking catalyst.

2. A process according to claim 1, which process further comprises a sulfidation step.

3. A process as recited in claim 1, wherein said low alkali ammonium form zeolite Y is steam calcined at a temperature in the range of from 550 to 750° C. and at a partial pressure of steam in the range of from 5 to 50 vol % based on the total gas present.

4. A process as recited in claim 3, wherein said alumina binder component is gamma alumina having a surface area of at least 50 $m^2/g$.

5. A process as recited in claim 4, wherein said naphtha-selective hydrocracking catalyst consists essentially of said zeolite Y component, said alumina binder component, a nickel component, and a molybdenum component.

6. A process as recited in claim 1, wherein said low alkali ammonium form zeolite Y component is prepared by providing a starting zeolite of faujasite structure having a silica to alumina ratio in the range of from 4.5 to 6.5 and an alkali level of less than 1.5% wt; steam calcining said starting zeolite at a temperature in the range of from 550 to 750° C. and at a partial pressure of steam in the range of from 5 to 50 vol % based on the total gas present to produce an intermediate zeolite; and contacting said intermediate zeolite with an acidified solution comprising from 4 to 9 mmole of an acid, having a pKa less than zero, per gram of zeolite, and an ammonium salt; and recovering said zeolite Y component.

7. A process as recited in claim 6, wherein said naphtha-selective hydrocracking catalyst comprises said zeolite Y component, said alumina binder component, a nickel component, a molybdenum component, and a material absence of tungsten.

8. A process as recited in claim 7, wherein said naphtha-selective hydrocracking catalyst has a compacted bulk density (CBD) of at least 0.40 g/cc.

9. A process as recited in claim 8, wherein said aqueous solution further comprises from 1 to 25% by weight citric acid and a material absence of tungsten.

10. A process as recited in claim 9, wherein said aqueous solution comprises from 2 to 20% by weight citric acid, said extrudate that has been dried but before its calcination has at least 0.10% and at most 12% citric acid by weight based on the total weight of the dried extrudate, said zeolite Y component has an alkali level of less than 0.10% wt., and said naphtha-selective hydrocracking catalyst has a compacted bulk density (CBD) of at least 0.45 g/cc.

11. A process as recited in claim 10, further comprising: sulfiding said naphtha-selective hydrocracking catalyst using a liquid phase sulfidation agent or using $H_2S$ in the gas phase at a temperature above 300° C.

12. A process for hydrocracking a hydrocarbonaceous feedstock, which process comprises contacting the feedstock at elevated temperature with a catalyst composition as prepared by a process as claimed in claim 1.

13. The process according to claim 12, which process comprises contacting the feedstock with the catalyst composition at a reaction temperature in the range of from 250 to 500° C. and a total pressure at the reactor inlet in the range of from $3 \times 10^6$ to $3 \times 10^7$ Pa.

* * * * *